United States Patent [19]

Loubineux et al.

[11] Patent Number: 5,139,593
[45] Date of Patent: Aug. 18, 1992

[54] PROCESS FOR MANUFACTURING A RIBBON CONSTITUTED BY AT LEAST ONE YARN IMPREGNATED WITH A THERMOPLASTICS POLYMER

[75] Inventors: Dominique Loubineux, Lyon; Gerard Lamure, Miribel, both of France

[73] Assignee: Institut Textile de France, Bagneux Cedex, France

[21] Appl. No.: 616,682

[22] Filed: Nov. 20, 1990

Related U.S. Application Data

[63] Continuation of Ser. No. 300,055, Jan. 19, 1989, abandoned.

[30] Foreign Application Priority Data

Jan. 22, 1988 [FR] France .............................. 88 00890

[51] Int. Cl.$^5$ .............................................. B29C 35/10
[52] U.S. Cl. .................................. 156/73.2; 156/166; 156/244.17; 156/244.27; 264/23; 264/174; 264/257
[58] Field of Search ............ 156/166, 244.11, 244.12, 156/244.22, 244.24, 244.27, 73,1, 73.2, 244.17; 264/23, 174, 257

[56] References Cited

U.S. PATENT DOCUMENTS

| | | | |
|---|---|---|---|
| 2,291,670 | 8/1942 | Wiley et al. | 264/174 |
| 3,627,613 | 12/1971 | Stolki | 156/244.27 |
| 4,878,969 | 11/1989 | Janisch | 156/250 |

*Primary Examiner*—Hubert C. Lorin
*Attorney, Agent, or Firm*—Shenier & O'Connor

[57] ABSTRACT

This invention relates to a process for manufacturing a ribbon constituted by at least one yarn impregnated with a thermoplastics polymer, wherein the ribbon is obtained by controlled sheathing of the yarn by the thermoplastics polymer, then passage of the yarn thus sheathed between two rollers crushing the yarn while the polymer is in its plastic state. This is obtained either by heating the rollers, or, preferably, by subjecting the polymer to the action of ultra-sounds during its passage between the two rollers.

2 Claims, 1 Drawing Sheet

U.S. Patent
Aug. 18, 1992
5,139,593
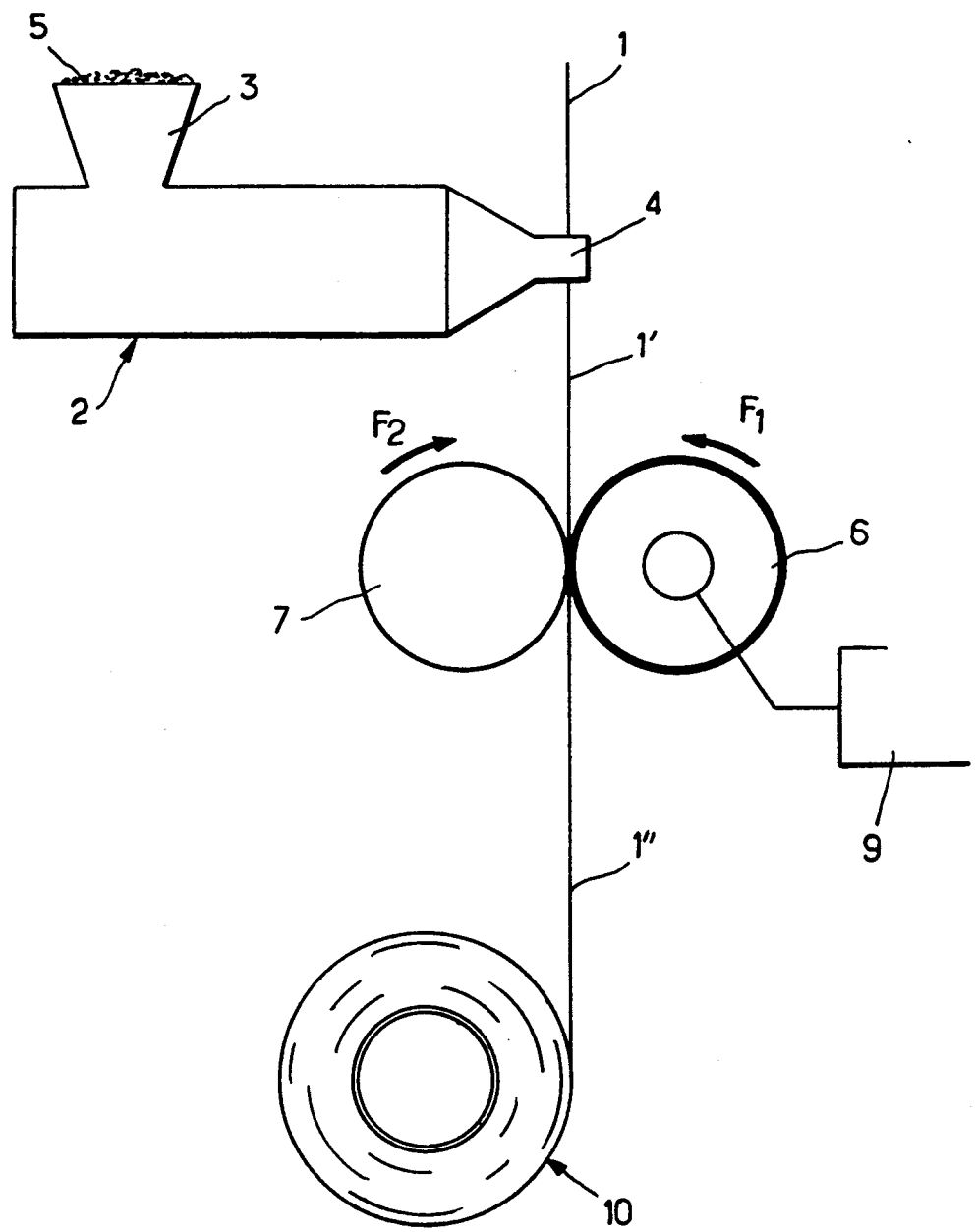

PROCESS FOR MANUFACTURING A RIBBON CONSTITUTED BY AT LEAST ONE YARN IMPREGNATED WITH A THERMOPLASTICS POLYMER

This is a continuation of copending application Ser. No. 07/300,055, filed Jan. 19, 1989, now abandoned.

FIELD OF THE INVENTION

The present invention relates to the manufacture of a ribbon constituted by at least one yarn impregnated with a polymer, more particularly a thermoplastics polymer, with a view in particular to using it for making composite materials.

BACKGROUND OF THE INVENTION

In the following specification, the term "ribbon" designates an element of indefinite length, of small width, for example some millimeters to some centimeters, constituted by a multi-filament yarn, or a lap of multi-filament yarns, impregnated with a polymer performing the role of matrix. This type of ribbon serves as the base for making composite materials, it is shaped for example by weaving, knitting, braiding, and the final composite product is obtained by a subsequent heat treatment: pultrusion, filament winding, compression.

Most composite materials with organic matrix are elaborated from yarns embedded in a thermosettable resin; the yarns are principally made of glass, carbon or aramide, the resins are principally epoxides, polyesters, phenolic resins and polyurethanes. These thermosettable resins are employed in solution or in the form of monomers, with a low viscosity, which ensures a very good impregnation of each filament constituting the reinforcing yarns. These composite materials have good mechanical properties both in elongation and in shear. However, they present a drawback from the mechanical standpoint, namely a certain fragility to shock and, furthermore, taking into account the kinetics of cross-linking of the thermosettable resins employed, the time necessary for making them is long.

It has already been sought to overcome these drawbacks by making composite materials from resins which are no longer thermosettable but thermoplastics. In fact, the use of these resins is simpler, their resistance to shock and fatigue resistance are better. However, in the molten state, they have a high viscosity which prevents a thorough penetration of the reinforcing yarns and therefore a homogeneous coating by the resin of the multi-filaments constituting each reinforcing yarn. In certain limited cases, allowing particular technical means to be carried out, a good thorough penetration may be obtained by working at high pressures; this is the case of so-called injection and compression techniques.

For the other techniques, for example filament winding, pultrusion or pulforming, the quality of the composite pieces obtained depends essentially on the quality of the thorough and homogeneous impregnation of the reinforcing yarns.

French Patents Nos. 74 01975, 83 03938 and 81 07971, disclose processes for obtaining a good impregnation of the reinforcing yarns by the thermoplastics resin. According to these processes, the thermoplastics polymer is in the form of a powder which is made to penetrate in the yarn by different techniques (electrostatic, suspension, fluidized bed). This powder must have a well controlled granulometry centred around 10 to 15 microns. In French Patent No. 84 05627, the yarn of which the filaments are surrounded by the thermoplastics powder, is then coated with a sheath having for its effect to block the powder inside the yarn and therefore avoid deterioration of the yarn when the composite product is made.

Application of these new processes is restricted, since not many thermoplastics polymers are in the form of calibrated powders.

An article published in the German Journal KUNSTSTOFFE No. 2 in 1988, discloses that multi-filament yarns may be impregnated with molten thermoplastics materials by passing them in an impregnation chamber. As illustrated in FIG. 9 of this Article, after impregnation, the multifilament yarns are taken along by extraction and cooling rollers.

According to Applicant, the process thus described does not allow a homogeneous penetration of the thermoplastics material, necessary for a perfect cohesion of the filaments and of the thermoplastics material.

SUMMARY OF THE INVENTION

A process for manufacturing a ribbon constituted by at least one multifilament yarn thoroughly impregnated with a thermoplastics polymer, which overcomes the drawbacks set forth, has now been found, and this is the subject matter of the present invention. The process of the invention consists in the following steps of:

a) effecting a controlled sheathing of the yarn (or yarns) by the thermoplastics polymer, b) and continuously advancing the yarn (or yarns) thus sheathed between two pressure rollers, whilst the sheathing polymer is simultaneously heated so that it is in its plastics state.

The sheathing of the yarn by the thermoplastics polymer has for its purpose to bring onto the yarn a determined quantity of polymer, at least necessary for a homogeneous coating of the filaments constituting the reinforcing yarn. The passage of the yarn between the two rollers has for its purpose to cause the polymer to penetrate between the filaments, whilst said polymer is in its plastic state. This latter condition is absolutely indispensable for a good penetration by simple calendering between two pressure rollers, as recommended in the process of the invention. Moreover, such calendering gives the yarn the form of a flat ribbon.

Controlled sheathing of the yarn by the thermoplastics polymer is preferably effected by passage of the yarn in the sheathing die of an extruding machine, supplied with the thermoplastics polymer in the form of granules. In this way, the polymer is, at the start, in its most current and least expensive form, contrarily to the processes using it in the form of calibrated powder.

During its passage between the two rollers, the polymer constituting the sheath of the yarn must be in its plastic state. This is obtained, for example, by passage of the sheathed yarn between two rollers of which at least one is taken to a temperature at least equal to the temperature of melting of the thermoplastics polymer. In the case of polypropylene being used as thermoplastics polymer, the temperature of the rollers is of the order of 200° C.

According to a preferred embodiment of the process of the invention, the polymer is taken to its plastic state by action of ultra-sounds during passage of the sheathed yarn between the two rollers.

The force exerted transversely on the yarn by the two pressure rollers is preferably of the order of 200 to 500N per centimeter of yarn.

It is another object of the invention to provide an installation specially designed for carrying out the process described above. This installation comprises a sheathing device capable of effecting a controlled sheathing of a multifilament yarn by a thermoplastics polymer and an impregnation assembly comprising a set of two pressure rollers provided with means for taking the polymer into its plastic state.

The sheathing device preferably consists of an extruding machine supplied with polymer in the form of granules and comprising a sheathing die. The impregnation assembly consists for example of a set of two heating rollers, of the calender type.

In a preferred embodiment of the installation of the invention, the impregnation assembly consists of a set of two pressure rollers of which one is a rotating sonotrode connected to an ultra-sound generator and the other constitutes the anvil corresponding to the sonotrode.

BRIEF DESCRIPTION OF THE DRAWINGS

The invention will be more readily understood on reading the following description with reference to the accompanying drawings, in which:

The single FIGURE schematically shows, in section, an installation according to the invention, equipped with a sonotrode, for manufacturing a flat ribbon constituted by at least one multifilament yarn impregnated with a thermoplastics polymer.

DETAILED DESCRIPTION OF THE DRAWINGS

Referring now to the drawings, the yarn 1 is supplied from an installation (not shown). It is question of a yarn intended to serve as reinforcement in the production of a composite material with thermoplastics matrix. It is preferably made of an inorganic material such as silica, glass, carbon. Its count is included for example between 50 and 1200 tex. The sizing with which yarn 1 is impregnated during manufacture is, of course, determined in order to be compatible with the thermoplastics polymer which was chosen to constitute the matrix of the composite material.

The extruding machine 2 is conventional equipment, with its supply hopper 3 and outlet die 4. The die 4 is a sheathing die of the electric cabler type with stamp and die adapted to the fragile yarns. It is equipped with a ceramic yarn guide so as not to damage the yarn 1. The inner diameter of the stamp of the die is 1.9 mm.

The thermoplastics polymer is chosen from a very broad range of products, for example, polyamides, polyesters, polypropylene, polyethylene, polyvinylchloride, polyacetals, vinylidene polyfluoride, phenylene polysulfide, polyetheretherketone, polysulfones, polycarbonate, polystyrene.

The polymer is introduced in the form of granules 5 into the hopper 3, then is taken in the different heating bodies of the extruding machine 2 up to the sheathing die 4. The inner body of the extruding machine 2 has a diameter of 30 mm, and the screw rotates at 15 revs per minute.

The pressure rollers 6 and 7 are placed beneath the die 4 so that their line of tangency is in the vertical plane passing through the die 4. One of the rollers 6 is per se a rotating sonotrode, connected to a generator 9, the other, 7, serves as anvil for the sonotrode 6. They have an outer diameter of 130 mm.

A system for receiving the ribbon is placed beneath the rollers 6 and 7, for example a winder. Only reel 10 has been shown in the Figure.

The installation operates as follows: the multifilament yarn 1 coming from a spinning reel is guided to the sheathing die 4. In its passage through die 4, the yarn 1 takes in the form of a sheath a certain quantity of thermoplastics polymer in the molten state. The yarn 1' thus sheathed then passes between the two rollers 6 and 7 which rotate about their horizontal axes in opposite directions (arrows F1 and F2). The speed of rotation of the rollers is determined so that their peripheral speed is equal to the speed of winding the ribbon 1" on the reel 10. During its passage between the two rollers 6 and 7, the sheathed yarn 1' is subjected to a double action: the first corresponds to the action of the ultra-sounds generated between the sonotrode 6 and the anvil 7 and the second to the pressure exerted by the two rollers 6 and 7 applied against each other. The ultra-sounds provoke immediate heating of the polymer and the power of the sonotrode is determined so that the thermoplastic polymer attains its plastic state. Simultaneously, the pressure exerted by the rollers forces the polymer in the plastic state to penetrate thoroughly in the yarn and to coat each of the filaments homogeneously; the yarn 1" takes the flat form of a ribbon. This ribbon 1" is wound in the form of a reel 10.

By way of example, a glass yarn E of 320 Tex was impregnated with polypropylene of grade 35. The respective temperatures of the three heating bodies of the extruding machine 2 were successively: 210, 230 and 240° C., the temperature of the die 4: 250° C. The sonotrode had a power of 1.2 kW at a frequency of 20 kHz. The flat yarn between the pressure rollers had a width of 2.5 mm and the force exerted transversely by the two pressure rollers was 120N. The ribbon 1" obtained comprised a proportion of 50% of polypropylene by weight. Its ultimate tensile strength was 15.5 daN and its elongation at rupture 2.6%.

In another example, the glass yarn was of 1200 Tex, the polypropylene had a grade of 250, the force exerted by the two rollers was 120N, but the flat yarn had a width of 4 mm.

The installation equipped with a sonotrode which has just been described is particularly advantageous insofar as the heating by ultra-sounds of the thermoplastic polymer, intervening simultaneously in the whole polymer mass, may be controlled so that the polymer in the plastic state does not adhere to the rollers 6 and 7. In this way, the quantity of polymer deposited on the yarn 1' after passage in the die 4 lies exactly on the ribbon 1" after passage between the two rollers. Furthermore, the ultra-sounds promote thorough impregnation of the multi-filament yarn by the polymer in the plastic state.

In another version of the installation, in which the two rollers 6 and 7 are rollers heated to 200° C., the same starting glass yarn led to a ribbon 1" comprising a proportion of 35% of polypropylene by weight. Its ultimate tensile strength was 16.3 daN and its elongation at rupture was 2.5%.

The ribbons 1" obtained are used in particular for making composite materials. Such materials will be made either from reels 10 of ribbon, or directly with the aid of the ribbon 1" leaving rollers 6 and 7 by the technique of filament winding. The composite materials made with the aid of these ribbons 1" may be with unidirectional reinforcements in the case of pultrusion, or with multidirectional reinforcements in the case of weaving or assembling the ribbons in several directions followed by a hot compression.

What is claimed is:

1. A process for manufacturing a flat ribbon used for making composite materials, said ribbon constituted by at least one multi-filament yarn thoroughly impregnated with a thermoplastic polymer, said process comprising the following steps of:
   a) effecting a controlled sheathing of the yarn by the thermoplastic polymer,
   b) continuously advancing the yarn thus sheathed between two pressure rollers, one of which is a rotating sonotrode connected to an ultra-sound generator and the other constitutes the anvil connected to the sonotrode and
   c) applying sufficient power from said generator to said sonotrode to melt said sheathing, whereby the melted thermoplastics material impregnates said yarn under the combined action of the ultrasounds generated between the sonotrode and the anvil and the pressure exerted by the two rollers applied against each other.

2. The process of claim 1, wherein the force exerted transversely on the yarn by the pressure rollers is of the order of 300 to 500N per centimeter of yarn.

* * * * *

UNITED STATES PATENT AND TRADEMARK OFFICE
CERTIFICATE OF CORRECTION

PATENT NO. : 5,139,593
DATED : August 18, 1992
INVENTOR(S) : Dominique Loubineux, et. al.

It is certified that error appears in the above-indentified patent and that said Letters Patent is hereby corrected as shown below:

On the Title page, item [19] and [54] the last name of the first inventor should read -- Loubinoux --.

Signed and Sealed this

Nineteenth Day of October, 1993

*Attest:*

BRUCE LEHMAN

*Attesting Officer*     *Commissioner of Patents and Trademarks*